(12) United States Patent
Lin et al.

(10) Patent No.: US 10,429,600 B2
(45) Date of Patent: Oct. 1, 2019

(54) OPTICAL TRANSCEIVER

(71) Applicant: Prime World International Holdings Ltd., New Taipei (TW)

(72) Inventors: Chien-Te Lin, New Taipei (TW); Chang-Sheng Lin, New Taipei (TW); Ming-You Lai, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 15/880,051

(22) Filed: Jan. 25, 2018

(65) Prior Publication Data

US 2018/0252878 A1 Sep. 6, 2018

(30) Foreign Application Priority Data

Mar. 3, 2017 (TW) ............................. 106107126 A

(51) Int. Cl.
  *G02B 6/42* (2006.01)
  *H01R 13/6594* (2011.01)
  *H01R 13/659* (2011.01)
  *H01R 12/72* (2011.01)

(52) U.S. Cl.
  CPC .......... *G02B 6/428* (2013.01); *G02B 6/4214* (2013.01); *G02B 6/4284* (2013.01); *G02B 6/423* (2013.01); *G02B 6/4212* (2013.01); *G02B 6/4246* (2013.01); *G02B 6/4256* (2013.01); *G02B 6/4292* (2013.01); *H01R 12/721* (2013.01); *H01R 13/659* (2013.01); *H01R 13/6594* (2013.01)

(58) Field of Classification Search
None
See application file for complete search history.

(56) References Cited

U.S. PATENT DOCUMENTS

| 2011/0134614 A1* | 6/2011 | Berger | G02B 6/4201 361/749 |
|---|---|---|---|
| 2012/0026708 A1* | 2/2012 | Huang | H05K 3/368 361/783 |
| 2017/0068055 A1* | 3/2017 | Masuda | G02B 6/3897 |

* cited by examiner

*Primary Examiner* — Jerry Rahll
(74) *Attorney, Agent, or Firm* — Grossman Tucker Perreault & Pfleger, PLLC

(57) ABSTRACT

An optical transceiver includes a photoelectric converter, an interposer and a circuit board. The interposer is disposed on the photoelectric converter. The interposer includes a board member and a flexible electrically conductive member disposed on the board member, and the photoelectric converter is electrically connected to the flexible electrically conductive member. The circuit board is disposed on a side of the interposer. The flexible electrically conductive member is remove-ably pressed against the circuit board so that the flexible conductive member is electrically connected to the circuit board.

8 Claims, 4 Drawing Sheets

OPTICAL TRANSCEIVER

CROSS-REFERENCE TO RELATED APPLICATIONS

This non-provisional application claims priority under 35 U. S. C. § 119(a) to Patent Application No(s). 106107126 filed in Taiwan on Mar. 3, 2017, the entire contents of which are hereby incorporated by reference.

TECHNICAL FIELD

The disclosure relates to an optical transceiver, more particularly to an optical transceiver having a flexible electrically conductive member.

BACKGROUND

Optical transceivers are commonly used in modern high-speed communication networks. The XFP (10 Gigabit Small Form Factor Pluggable) and the QSFP (Quad Small Form-factor Pluggable) are standards for the optical transceivers in order to define the electrical and the mechanical interfaces between the optical transceiver and the corresponding receptacle. Generally, the optical transceivers include a transmitter of optical subassembly (TOSA), a receiver optical subassembly (ROSA) and a circuit board. The TOSA includes a laser driving chip and a laser diode (LD), and the ROSA includes a transimpedance amplifier (TIA) and a photo detector.

SUMMARY

The present disclosure provides an optical transceiver.

One embodiment of the disclosure provides an optical transceiver. The disclosed optical transceiver includes a photoelectric converter, an interposer and a circuit board. The interposer is disposed on the photoelectric converter. The interposer includes a board member and a flexible electrically conductive member. The flexible electrically conductive member is disposed on the board member, and the photoelectric converter is electrically connected to the flexible electrically conductive member. The circuit board is disposed on a side of the interposer. The flexible electrically conductive member is remove-ably pressed against the circuit board so that the flexible conductive member could be electrically connected to the circuit board.

BRIEF DESCRIPTION OF THE DRAWINGS

The present disclosure will become more fully understood from the detailed description given here in below and the accompanying drawings which are given by way of illustration only and thus are not intending to limit the present disclosure and wherein.

DETAILED DESCRIPTION

Figure 1:
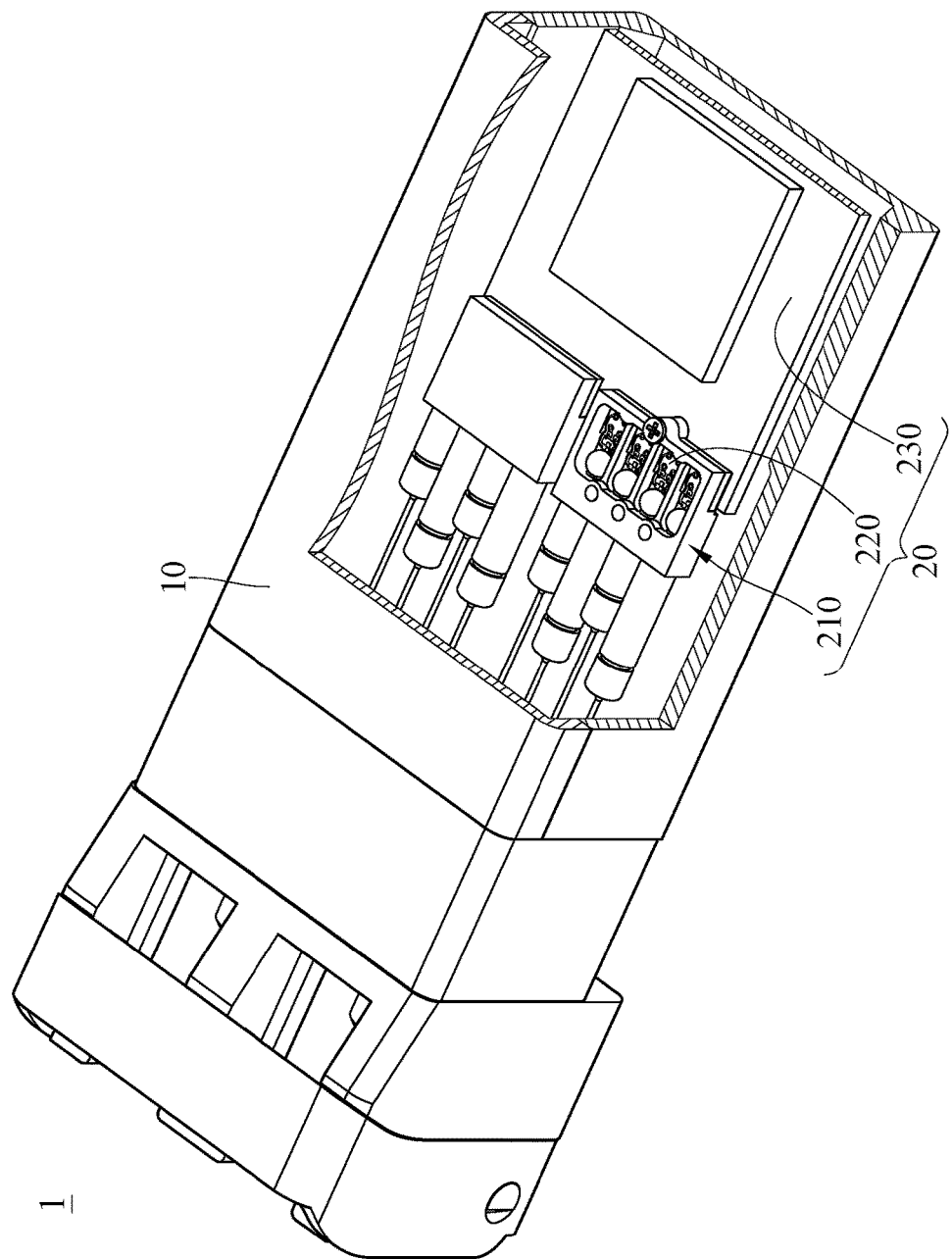
FIG. 1 is a perspective view of an optical transceiver in accordance with one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
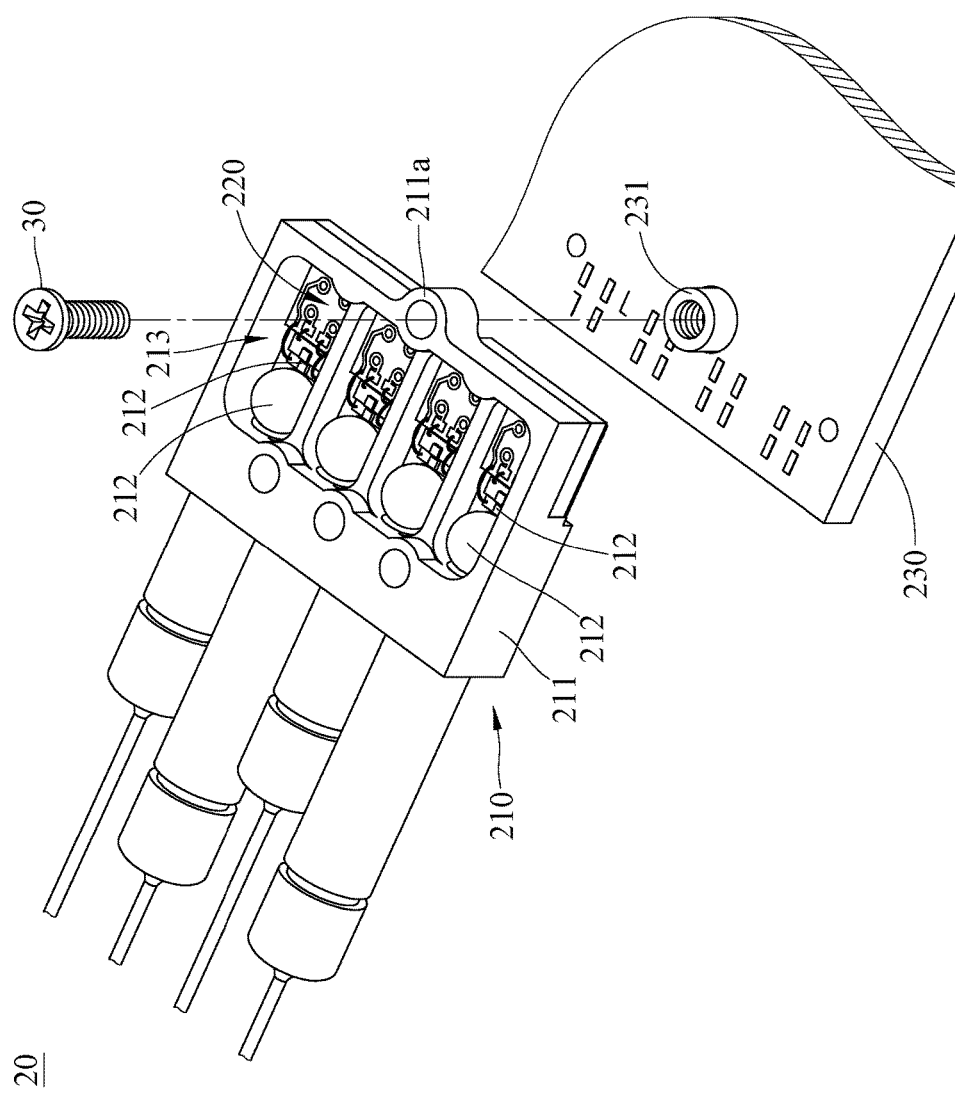
FIG. 2 is an enlarged exploded view of an electronic assembly of the optical transceiver in FIG. 1.

Please refer to FIG. 1 and FIG. 2. FIG. 1 is a perspective view of an optical transceiver in accordance with one embodiment of the disclosure. FIG. 2 is an enlarged exploded view of an electronic assembly of the optical transceiver in FIG. 1. In this embodiment, an optical transceiver 1 is provided. The optical transceiver 1 includes an outer casing 10 and an electronic assembly 20. The electronic assembly 20 is disposed in the outer casing 10. The electronic assembly 20 includes a photoelectric converter 210, an interposer 220 and a circuit board 230.

The photoelectric converter 210 is, for example, a transmitter optical subassembly (TOSA), but the present disclosure is not limited thereto. In other embodiments, the photoelectric converter 210 can be a receiver optical subassembly (ROSA). In this embodiment, the photoelectric converter 210 includes a casing 211 and a plurality of light emitting elements 212. The light emitting elements 212 are disposed in the casing 211. The light emitting elements 212 include, for example, a plurality of laser diodes, or a plurality of lens and laser diodes. In addition, the casing 211 of the photoelectric converter 210 has a first assembling portion 211a.

Figure 3:
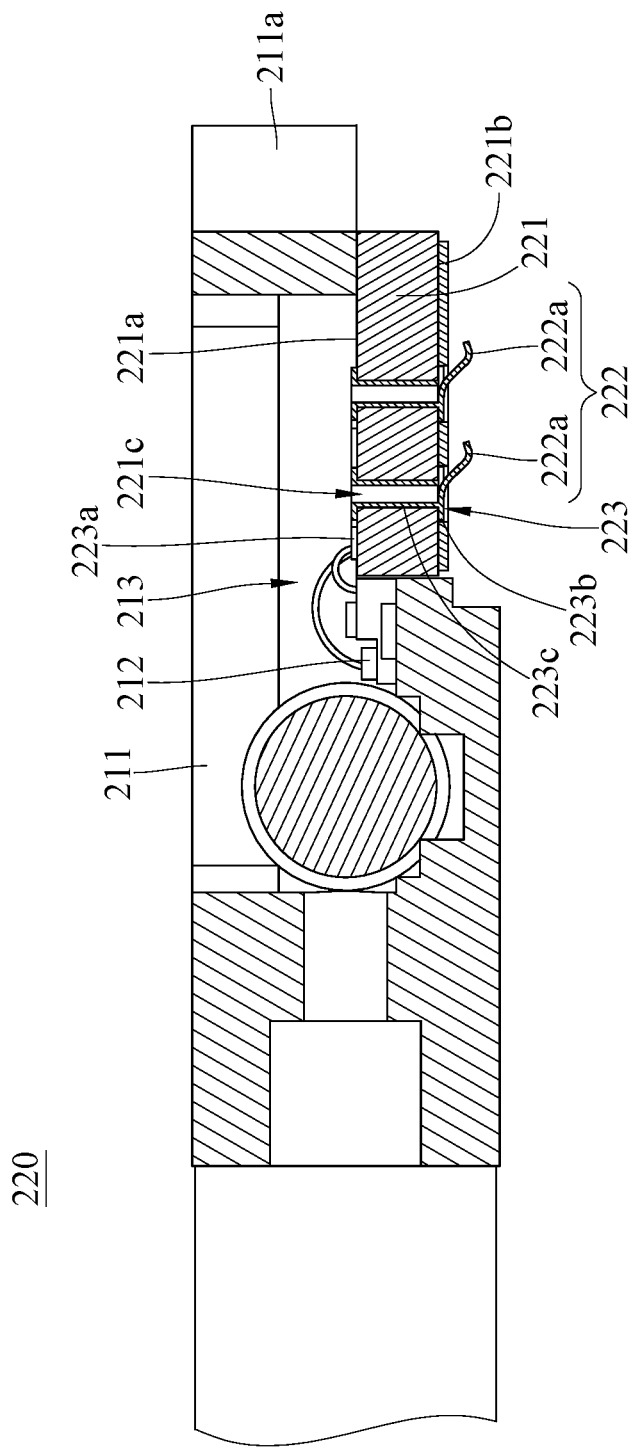
FIG. 3 is a cross-sectional view of a photoelectric converter of the electronic assembly in FIG. 2.
Figure 4:
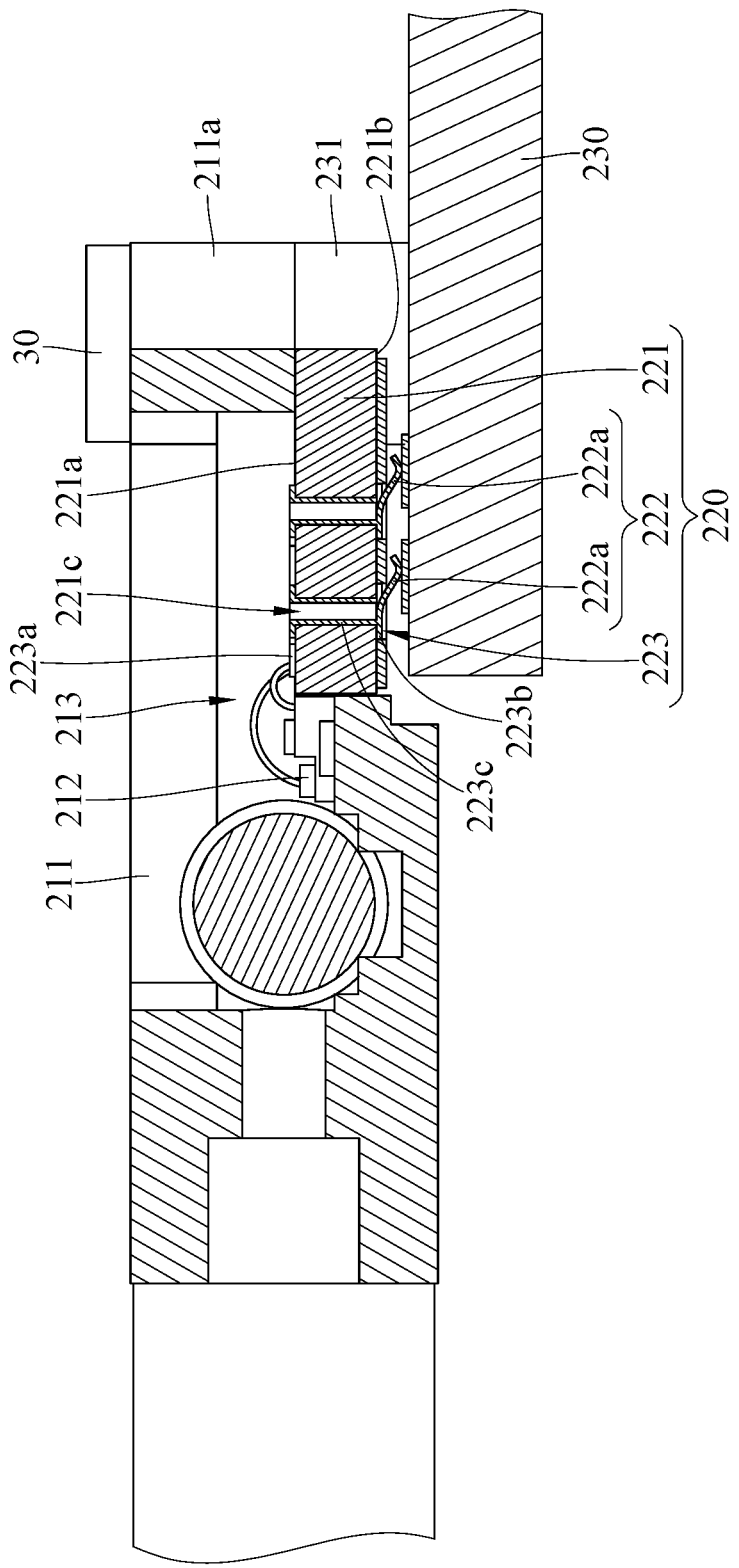
FIG. 4 is a cross-sectional view of the electronic assembly of the optical transceiver in FIG. 1.

Please further refer to FIG. 2 to FIG. 4. FIG. 3 is a cross-sectional view of a photoelectric converter of the electronic assembly in FIG. 2. FIG. 4 is a cross-sectional view of the electronic assembly of the optical transceiver in FIG. 1.

The interposer 220 is disposed on the casing 211 of the photoelectric converter 210. The interposer 220 includes a board member 221, a flexible electrically conductive member 222 and an electrically conductive structure 223. The board member 221 of the interposer 220 has a top surface 221a, a bottom surface 221b, and a through hole 221c. The top surface 221a is opposite to the bottom surface 221b. Two opposite ends of the through hole 221c respectively connect to the top surface 221a and the bottom surface 221b. The board member 221 is disposed in an accommodating space 213 of the casing 211, and the top surface 221a faces the accommodating space 213. The light emitting elements 212 are electrically connected to the top surface 221a of the board member 221, and the flexible electrically conductive member 222 protrudes from the casing 211.

The flexible electrically conductive member 222 is disposed on the board member 221, and the photoelectric converter 210 is electrically connected to the flexible electrically conductive member 222 through the electrically conductive structure 223. The electrically conductive structure 223 includes a first horizontal segment 223a, a second horizontal segment 223b and a vertical segment 223c. The first horizontal segment 223a is disposed on the top surface 221a of the board member 221, the second horizontal segment 223b is disposed on the bottom surface 221b, and the vertical segment 223c is disposed on the inner surface of the through hole 221c. The first horizontal segment 223a, the second horizontal segment 223b and the vertical segment 223c are electrically connected to one another. The light emitting element 212 of the photoelectric converter 210 is, for example, electrically connected to the first horizontal segment 223a of the electrically conductive structure 223 through wire bonding.

The flexible electrically conductive member 222 is disposed on the bottom surface 221b of the board member 221 and electrically connected to the second horizontal segment 223b of the electrically conductive structure 223. In this embodiment, the flexible electrically conductive member 222 includes a plurality of elastic pieces 222a. More precisely, the elastic pieces 222a are all disposed on the bottom surface 221b but not on the top surface 221a. Therefore, while the interposer 220 is assembled to the photoelectric converter 210 there might be some space above the interposer 220 available allowing for the photoelectric converter 210 not to interfere with the interposer 220.

The circuit board 230 is disposed on a side of the interposer 220. In this embodiment, the circuit board 230 is a printed circuit board in the optical transceiver 1 for connecting multiple photoelectric converters 210, and the circuit board 230 has at least one driving integrated chip. The circuit board 230 faces the bottom surface 221b of the interposer 220. The circuit board 230 has a second assembling portion 231 corresponding to the first assembling portion 211a of the photoelectric converter 210. In this embodiment, the first assembling portion 211a and the second assembling portion 231 are both threaded holes.

The elastic pieces 222a of the flexible electrically conductive member 222 are remove-ably pressed against the circuit board 230 to electrically connect the photoelectric converter 210 and the circuit board 230. In detail, when the photoelectric converter 210 is assembled to the circuit board 230, the elastic pieces 222a of the flexible electrically conductive member 222 press against the electrically conductive structure (e.g., a metal pad) of the circuit board 230 so that the flexible electrically conductive member 222 could be electrically connected to the circuit board 230, and the first assembling portion 211a is aligned with the second assembling portion 231. Then, a screw 30 is screwed into the first assembling portion 211a and the second assembling portion 231 in order to fasten the first assembling portion 211a with the second assembling portion 231 and enable the flexible electrically conductive member 222 to be in contact with the electrically conductive structure of the circuit board 230 in a secured fashion. It is noted that the photoelectric converter 210 is able to be disassembled from the circuit board 230 by simply unscrewing the screw 30.

In this embodiment, the first assembling portion 211a and the second assembling portion 231 are fastened to each other via a screw (i.e., the screw 30), but the present disclosure is not limited thereto. In other embodiments, the first assembling portion 211a and the second assembling portion 231 can be fastened to each other through an engaging component or by adhering.

According to the optical transceiver of the disclosure as discussed above, the photoelectric converter is electrically connected to the circuit board through the flexible electrically conductive member and the interposer, but not by soldering or adhering. Therefore, the photoelectric converter is able to be quickly assembled to or disassembled from the circuit board. In addition, the photoelectric converter can be assembled to circuit board without the flexible circuit board. As a result, the assembly process is simplified and the assembly time is reduced to improve both production yield and maintenance efficiency.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. An optical transceiver, comprising:
   a photoelectric converter;
   an interposer, disposed on the photoelectric converter, the interposer comprising a board member and a flexible electrically conductive member, the flexible electrically conductive member disposed on the board member and electrically connected to the photoelectric converter, wherein the photoelectric converter has an accommodating space, the board member of the interposer is disposed in the accommodating space; and
   a circuit board, disposed on a side of the interposer, and the flexible electrically conductive member removeably pressed against the circuit board so that the flexible electrically conductive member is electrically connected to the circuit board.

2. The optical transceiver according to claim 1, wherein the flexible electrically conductive member comprises a plurality of elastic pieces.

3. The optical transceiver according to claim 1, wherein the board member of the interposer has a top surface and a bottom surface, the top surface of the board member faces the accommodating space, the bottom surface faces the circuit board, and the flexible electrically conductive member is disposed on the bottom surface.

4. The optical transceiver according to claim 3, wherein the top surface of the board member fails to have the flexible electrically member disposed thereon.

5. The optical transceiver according to claim 3, wherein the interposer further comprises an electrically conductive structure, the board member has a through hole, two opposite ends of the through hole respectively connect to the top surface and the bottom surface of the board member, the electrically conductive structure is disposed on the top surface, an inner surface of the through hole and the bottom surface, and the flexible electrically conductive member is electrically connected to the photoelectric converter through the electrically conductive structure.

6. The optical transceiver according to claim 3, wherein the photoelectric converter comprises a casing and a light emitting element, the casing has the accommodating space, the light emitting element is disposed in the accommodating space, and the light emitting element is electrically connected to the top surface of the board member of the interposer.

7. The optical transceiver according to claim 1, wherein the photoelectric converter has a first assembling portion, the circuit board has a second assembling portion, and the first assembling portion is fastened to the second assembling portion.

8. The optical transceiver according to claim 1, wherein the photoelectric converter and the circuit board each comprise a threaded hole for fastening the photoelectric converter to the circuit board.

* * * * *